(12) United States Patent
Moroney et al.

(10) Patent No.: US 7,058,609 B2
(45) Date of Patent: Jun. 6, 2006

(54) PAY BY TIME SYSTEM FOR CONTENT DELIVERY TO MEDIA PLAYBACK SYSTEMS

(75) Inventors: Paul Moroney, Encinitas, CA (US); Eric J. Sprunk, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 454 days.

(21) Appl. No.: 10/114,898

(22) Filed: Apr. 2, 2002

(65) Prior Publication Data

US 2002/0169724 A1 Nov. 14, 2002

Related U.S. Application Data

(63) Continuation of application No. PCT/US01/18022, filed on May 31, 2001.

(60) Provisional application No. 60/209,898, filed on Jun. 7, 2000.

(51) Int. Cl.
*G06F 17/60* (2006.01)
(52) U.S. Cl. .............................. 705/59; 705/1; 705/57; 705/58; 380/255
(58) Field of Classification Search ................... 705/1, 705/59, 57, 58; 380/255
See application file for complete search history.

(56) References Cited

U.S. PATENT DOCUMENTS 4,827,508 A * 5/1989 Shear .......................... 705/53

FOREIGN PATENT DOCUMENTS

| EP | 0297988 A | | 4/1989 |
| EP | 0708561 A | | 4/1998 |
| JP | 2003030056 A | * | 1/2003 |
| WO | WO 9626605 A | | 8/1996 |

OTHER PUBLICATIONS

Self Protecting Digital Content, Paul Kocher, Feb. 27 2004.*

* cited by examiner

*Primary Examiner*—James P. Trammel
*Assistant Examiner*—John M. Winter
(74) *Attorney, Agent, or Firm*—Townsend and Townsend and Crew LLP (57) ABSTRACT

A system is described for allowing "pay by time" purchasing of digital video programming. The system provides for a variable or metered approach. A user can purchase a fraction of a program for a price different from that required for purchasing the entire program. Records of the user's viewing can be created to record, e.g., when a user started receiving a program, how long the user received a program, and when the user stopped receiving a program.

23 Claims, 10 Drawing Sheets

| EVENT | START | TOTAL | END |
|---|---|---|---|
| 700 | 4 | 5 | 8 |

| EVENT | START | TOTAL | END |
|---|---|---|---|
| 700 | 4 | 11 | 17 |

| EVENT | START | TOTAL | END |
|---|---|---|---|
| 700 | 4 | 16 | 25 |

PAY BY TIME SYSTEM FOR CONTENT DELIVERY TO MEDIA PLAYBACK SYSTEMS

CROSS-REFERENCES TO RELATED APPLICATIONS

This application is a continuation of International Application No. PCT/US01/18022, filed on May 31, 2001, which was published in English on Dec. 13, 2001 under PCT Article 21(2) and claims the benefit of U.S. provisional patent application 60/209,898, filed on Jun. 7, 2000, entitled "Pay by Time System for Content Delivery to Media Playback Systems" which are hereby incorporated by reference for all purposes.

BACKGROUND OF THE INVENTION

The present invention relates in general to payment schemes for information distribution systems and more specifically to a system for allowing different payment schemes where a user is obtaining content such as video programs in digital format.

It is useful to have flexible payment schemes to allow users a wide possibility of choices in purchasing digital content such as video, audio, text, or other information. For example, today's consumers can order "pay-per-view" television programs which allow the consumer to purchase individual programs. However, the cost of purchasing a program is the same regardless of whether the consumer purchases and views the entire program, or just a portion of the program. For example, if a consumer selects a program midway through that program's broadcast, the cost to the consumer is still the full price for the program. Thus, it would be useful to allow for different pricing schemes, for example, to allow a consumer to purchase portions of a program at reduced cost.

The implementation of a flexible payment scheme would preferably be compatible with existing delivery mechanisms. For example, security is a big issue for digital content delivery. Typically, the information is encrypted, or otherwise restricted, so that users who have not paid, who are not authorized, etc., are prevented from making use of the information. One approach uses cryptographic "keys" which are used to decrypt digital information prior to using the information by, e.g., displaying the information on a television screen. Such keys may be generated, re-generated, or derived at different intervals, e.g., on the order of months to every tenth of a second, or so. Any payment scheme must work within the security architecture of the digital information delivery system to provide access to the information according to the payment scheme.

BRIEF SUMMARY OF THE INVENTION

One embodiment of the invention provides a method of measuring reception of program content by a user. The method provides program content for reception by the user, provides multiple keys for use by the user in decrypting the program content, such that each of the keys is operable for a predefined portion of the program content, and determines an amount of time that the user receives the program content based upon how many of the plurality of keys are provided to the user. The user may be billed for the amount of time viewed by communicating the number of epochs viewed or received to a billing center.

One embodiment of the invention provides an apparatus for measuring reception of program content by a user. Such an apparatus can be comprised of a content receiver, such as a set-top box, operable to receive multiple keys for use in decrypting the program content for the user, and a processor operable to determine a cumulative number of the multiple keys utilized in decrypting the program content for the user.

Another embodiment of the invention provides a computer readable medium having a data structure stored thereon representing a first field containing data representing a program event and a second field containing data representing how long a user received the program event.

Yet another embodiment of the invention provides a computer data signal embodied in an electromagnetic signal. The data signal is comprised of a program event segment and a received program duration segment representing how long the program event was received by the user.

DETAILED DESCRIPTION OF THE INVENTION

The present embodiment of the invention can be described with reference to a program delivery system, such as the type used to deliver television or movie programming to a user's home. Pay per view systems have been used in the past to allow users to purchase an entire program regardless of the amount of time that they actually watch a program. Thus, for example, one can purchase a movie as a pay per view in one's home or at a hotel. Furthermore, one can purchase a sporting event, such as a boxing match, when desired. These are examples, however, of events for which a user does not mind paying for the entire event, because, typically the user watches the entire event. For example, a user usually wants to watch a movie from start to finish or a boxing match from the very beginning. Consequently, the viewer does not mind paying for the entire event.

However, there are some types of programming for which a user would prefer not to have to pay for the time when the program was not actually received. Thus, for example, portions of a song could be received without the need to hear the entire song. Similarly, portions of a news broadcast, e.g., the weather, could be received without the user wanting to pay for receiving the remainder of the news programming. The normal pay per view system does not satisfy such viewing requirements. Thus, it does not facilitate the commercial aspects of this type of programming from the perspective of either the viewer who would like to purchase the programming or the service provider who would like to market the programming.

One embodiment of the invention addresses these concerns to resolve some of the problems created by billing for an entire program under a pay per view system. Namely, the method shown in FIG. 1 illustrates a metered payment system in which reception of a program content is measured for billing of a client or customer.

Figure 1:
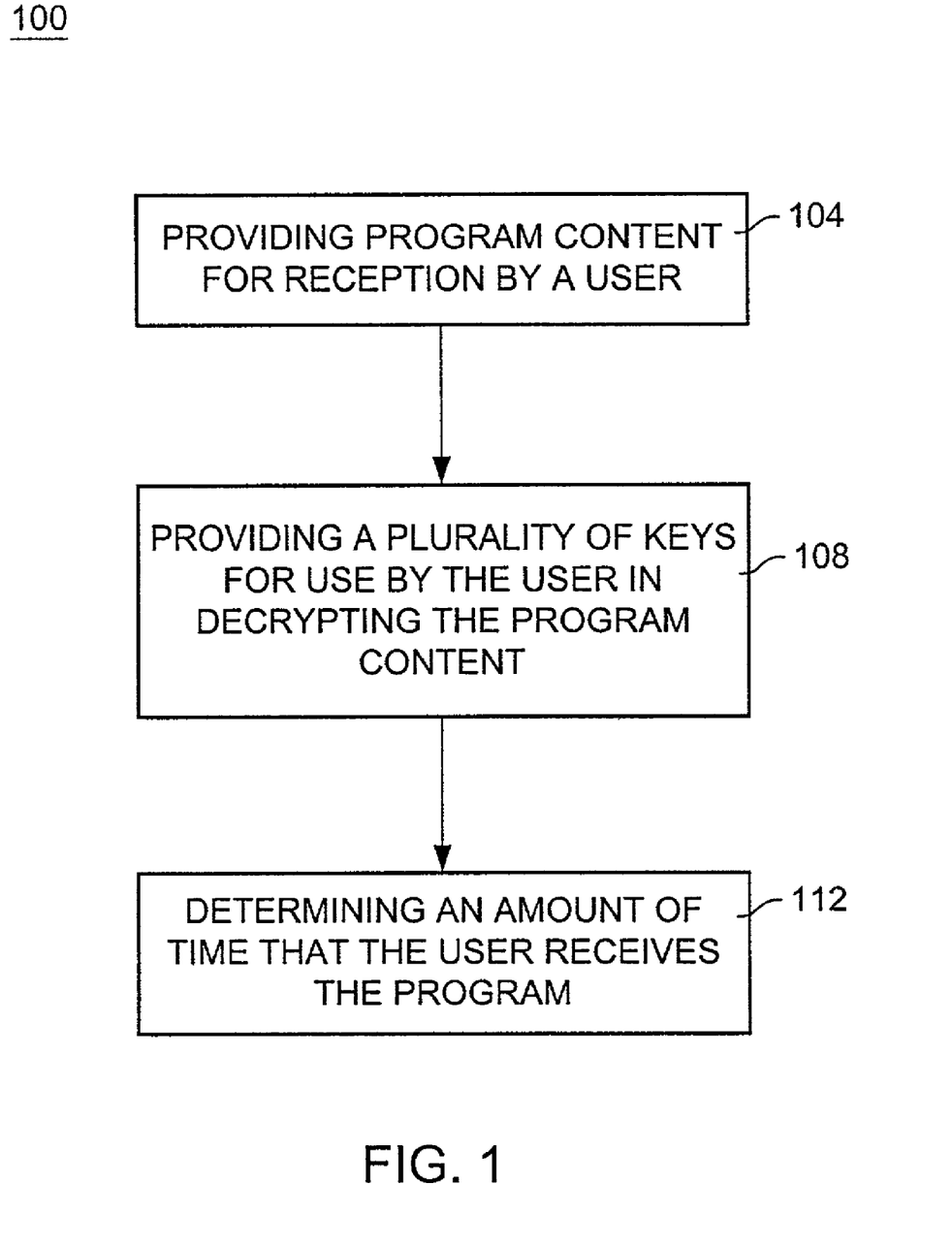
FIG. 1 illustrates a flowchart describing an embodiment of the invention for utilizing a plurality of cryptographic keys to determine an amount of time that the user receives the program.

In the method 100 of FIG. 1, program content is provided for reception by a user in block 104. For example, such program content could take the form of a service in a content stream, such as that provided to residential customers from their cable systems. Typically with cable systems, multiple services are available in a content stream from which the consumer can select a desired service (e.g., HBO™, ESPN™, SHOWTIME™, a music channel, an internet website, etc.). Typically, such cable transmissions are encrypted with keys being distributed to the user for decrypting the encrypted program stream. However, the intervals at which these keys are distributed to the user can vary. In some systems, a single key might be used for an entire program or for an entire month, while for other systems or types of programming a new key might be sent every tenth (1/10) of a second. Generally keys will be changed more frequently for more valuable programming. Thus, during a program, a plurality of keys is provided for use by the user in decrypting the program content, as shown in block 108. In block 112, a determination can be made as to how long the viewer received the program based on the keys received by the user for the program.

Figure 2A:
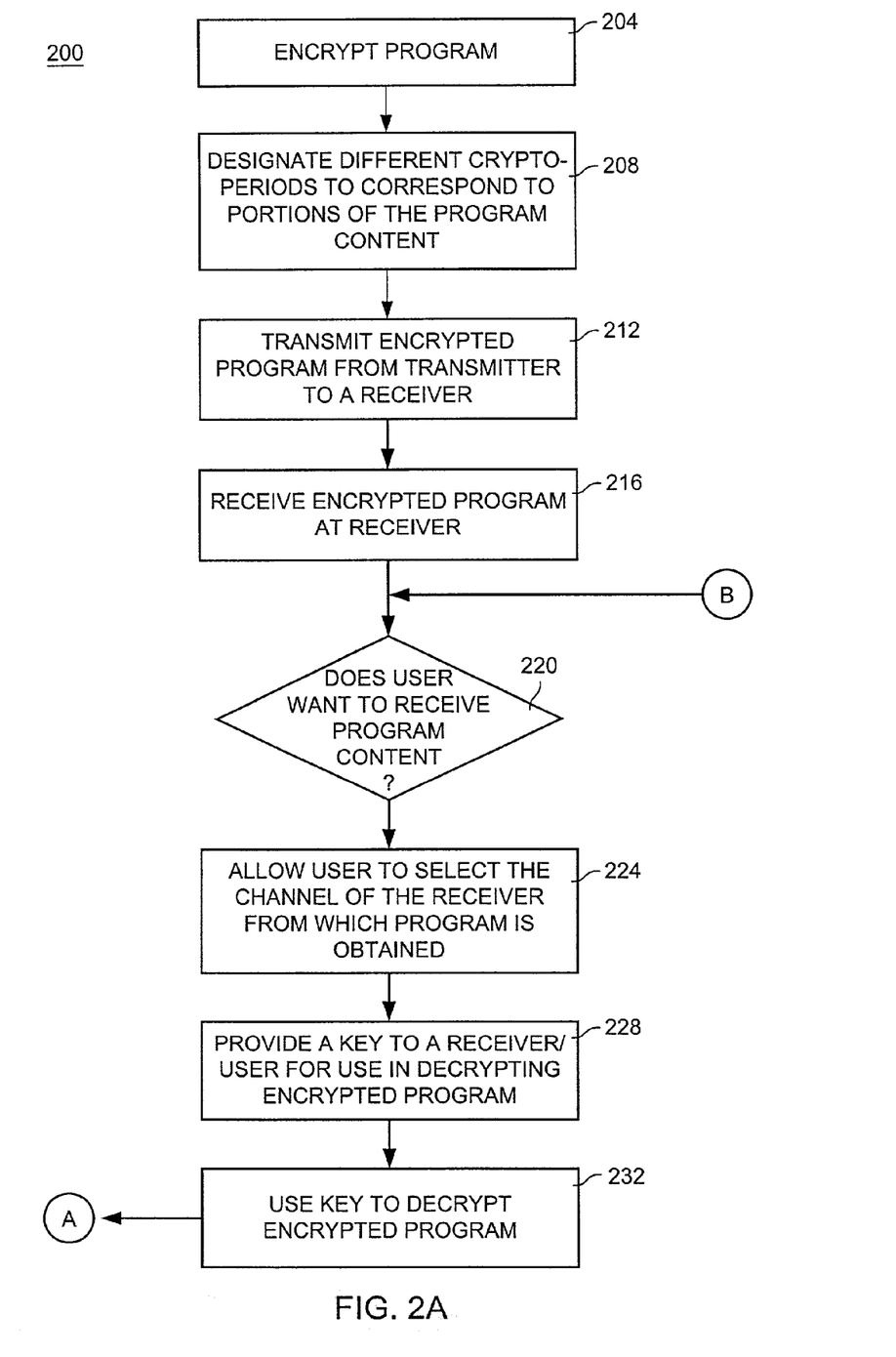
FIGS. 2a and 2b illustrate a flowchart describing an embodiment of the invention for tracking an amount of time that a user watches a program so as to determine a billing record for the user for that program.
Figure 2B:
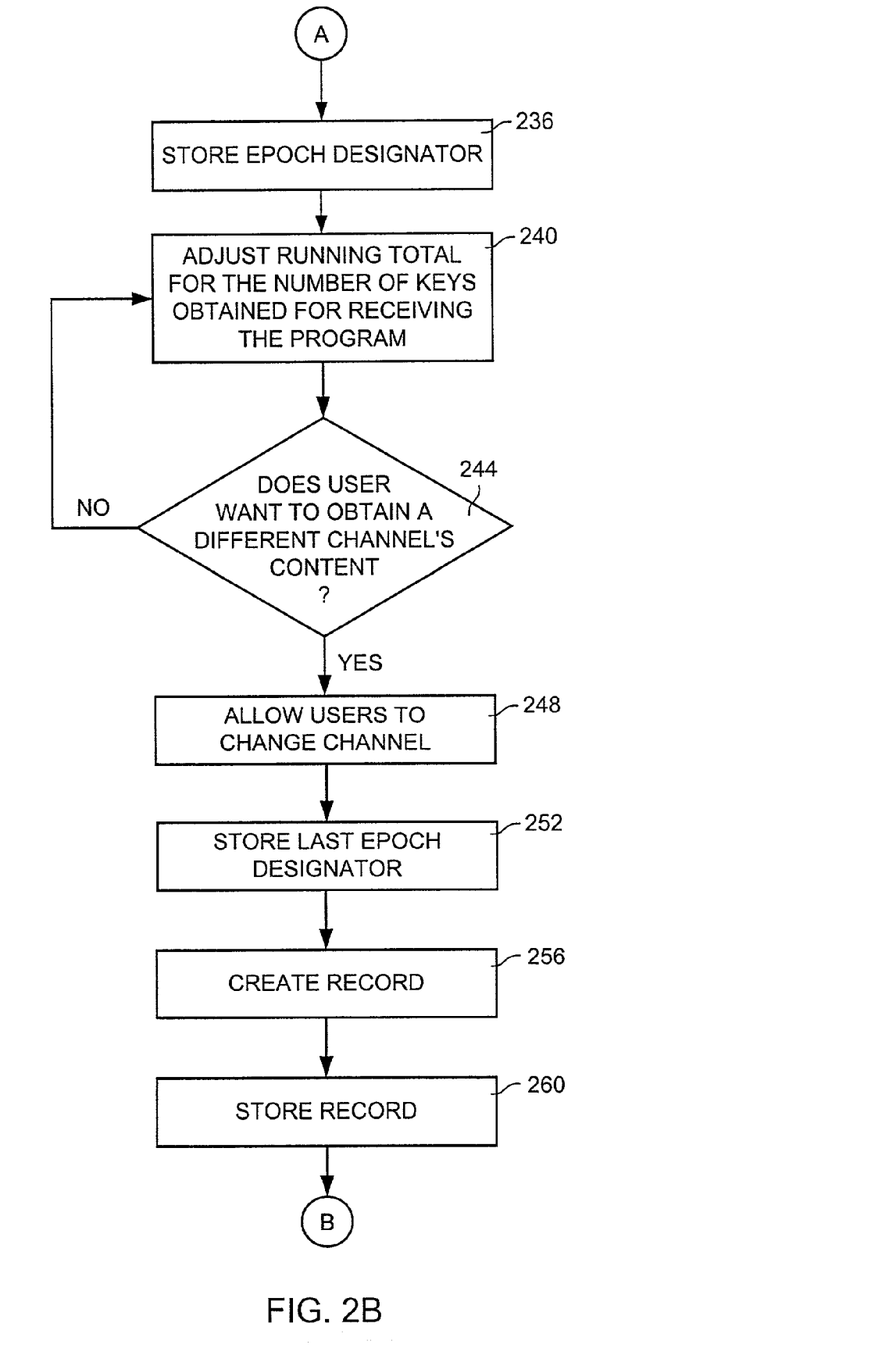

FIGS. 2a and 2b contain a flowchart 200 illustrating another embodiment of the invention. In FIG. 2a, block 204 shows that the program content is encrypted, for example at the head-end of a cable system. In block 208, cryptoperiods are designated to correspond to portions of the program content. For example, the program content can be divided into 133 millisecond intervals. Thus, each 133 millisecond segment of the program would be a cryptoperiod.

In block 212, the encrypted program is transmitted from a transmitter to a receiver. For example, the program could be transmitted from the head-end of a cable system to a content receiver, such as a set-top box, in a consumer's home. Thus, in block 216, the encrypted program is shown as being received at the receiver.

In block 220, a determination is made as to whether the user wants to receive the program content. For example, a user watching television would normally select a desired channel in order to receive the desired service. If the user does want to receive the program content for a service, the user selects the channel of the receiver from which the program is received in block 224.

In order to allow the user to make use of the program content, the service provider (e.g., the cable company) provides the receiver or user with a key to decrypt the encrypted program material, as illustrated in block 228. The key is used to decrypt the encrypted program in block 232.

Figure 7A:
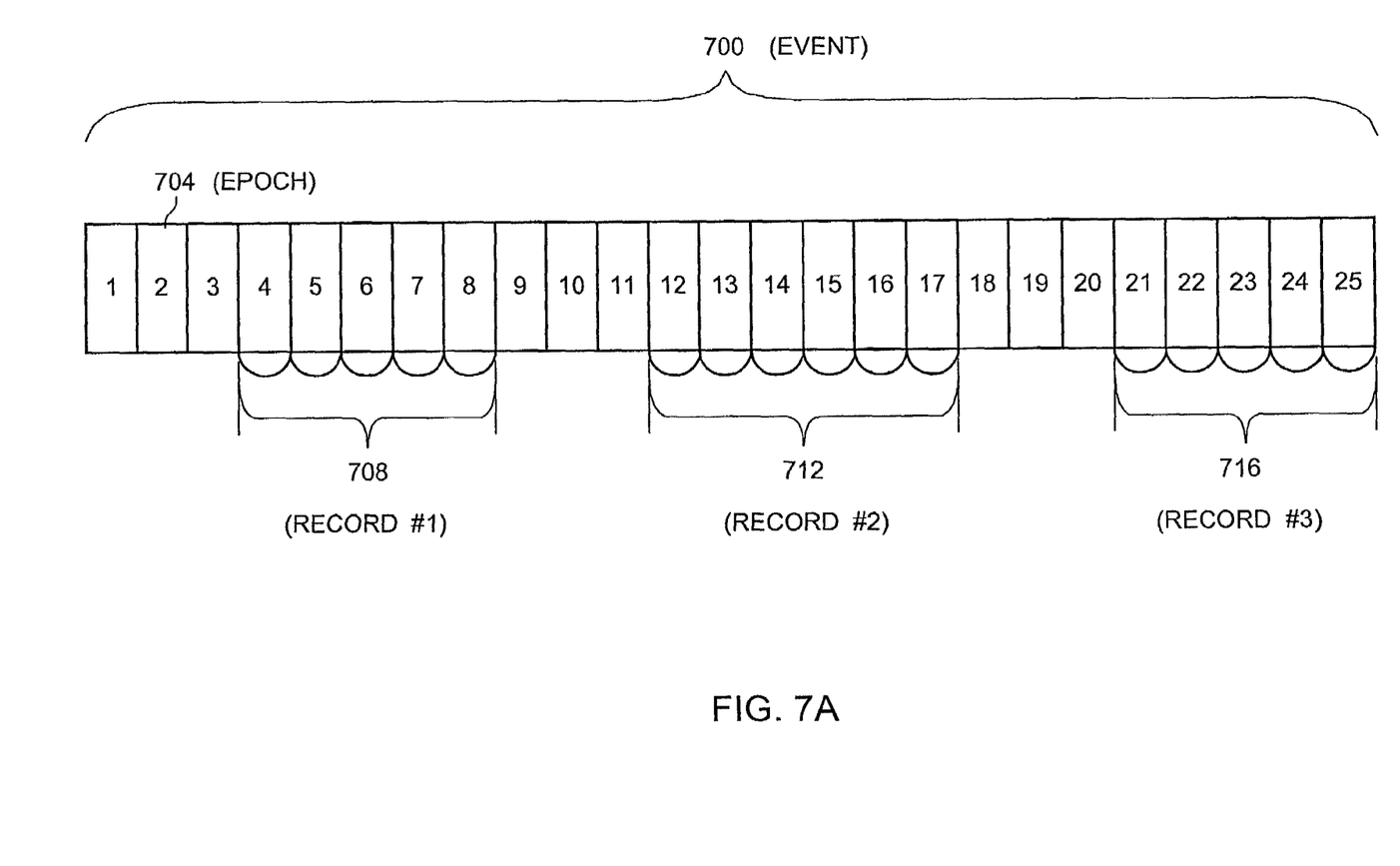
FIG. 7 illustrates an embodiment of the invention describing program content available for reception by a user and actual received content by the user, as well as a running account describing the total amount of the program received by the user.

In FIG. 7a, a sample program or event 700 is shown. As one example, the event could be a boxing match. The event is divided into epochs as shown by the divided portions 1 through 25 in FIG. 7a. An exemplary epoch 704 is shown in block 2 of the event 700. Each epoch corresponds to a corresponding crypto-period in which the program material for the epoch is obtained by a cryptographic operation, such as decryption through the use of a decryption key. Typically, new keys would be used for different crypto-periods. Each epoch of a program can be designated by an epoch designator such as a binary value corresponding to the location of that particular epoch in the program. Thus, block number 2 in FIG. 7a could be designated as "00010" while block 25 could be designated as "11001."

In block 236 of FIG. 2b, the epoch designator 236 is stored. This could occur at various locations in the system. However, for purposes of this example, it will be described as occurring at the receiver. Thus, one can track or record when a user begins receiving a selected program by storing the epoch designator. In block 240, the running total for the number of keys used to decrypt the program is adjusted. Initially, the running total will be zero until the initial epoch is received. Thus, with the initial selection of the program, the total number of keys can be adjusted to 1. With reception of additional keys and corresponding epochs, the total number of keys can be increased accordingly.

At some point a user will decide to change channels. Thus, in block 244 a determination is made as to whether the user wants to obtain a different channel's content. If the user does not want to obtain a different channel, the original content will continue to be decrypted and the running total of keys will continue to be generated. However, if the user does want to obtain a different channel's content, the user will be allowed to change the channel of the receiver as shown in block 248. When the user does decide to change channels, the last received epoch is determined so that a record can be created for the received portion of the program, as shown by blocks 252 and 256. This can be illustrated by FIG. 7b as it corresponds with the interval 708 in FIG. 7a.

Figure 7B:
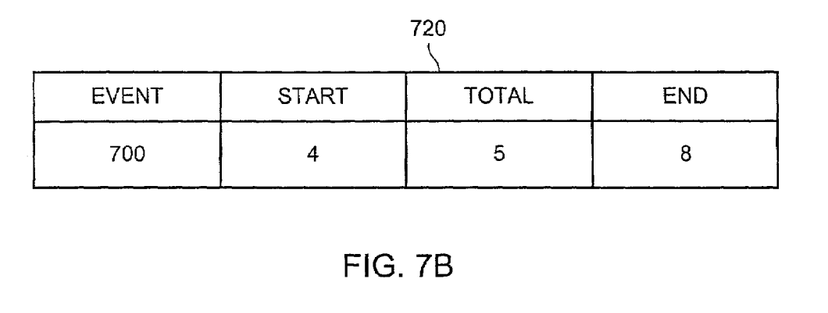

In FIG. 7b, a record of an event is shown as having an event identifier, a starting epoch, a total number of watched epochs and an ending epoch of the event. In FIG. 7b, the event is designated as "700." Similarly, the starting epoch of the watched event is designated as epoch number "4" and the ending epoch is designated as epoch number 8. Since a total of 5 epochs were watched for the program, the "Total" field of the record is designated as "5" for this first record.

Referring again to FIG. 2b, the record can be stored at the receiver for later transmission to a billing center. This allows the user to be billed based on the total amount of the program that was received, for example. Once the user selects a new channel the process can be repeated by returning to block 220 in FIG. 2a. This allows the user to create a new record for a different program or event, such as a movie instead of the previously mentioned boxing match.

Figure 7C:
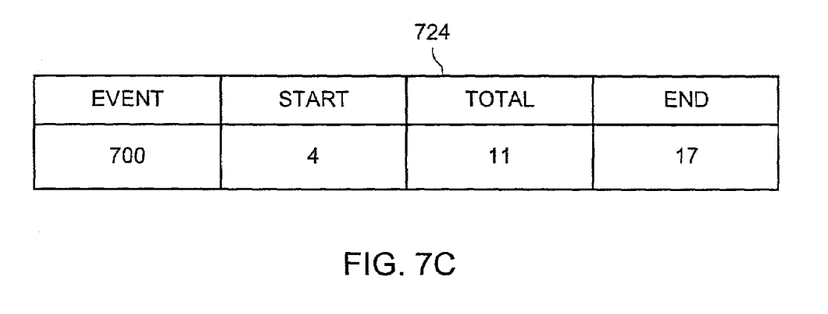

After the user returns to the original event 700, a second record is created. The second record can be initiated by starting at block 220 in FIG. 2a and repeating blocks 224, 228, 232, 236, 240, 244, 248, 252, 256, and 260. The format of the second record can take different formats depending on the system's configuration. FIG. 7c shows one format for such a second record. In FIG. 7c, the second record corresponding to the epochs shown as 712 in FIG. 7a comprises an event designator "700", a starting epoch "4" corresponding to the first received epoch in FIG. 7a, the total number of epochs received "11" (corresponding to received epochs 4, 5, 6, 7, 8 and 12, 13, 14, 15, 16, 17) and an ending epoch "17" corresponding to the last epoch received. This data record could take alternative forms, as well, as one of ordinary skill in the art would appreciate.

Figure 7D:
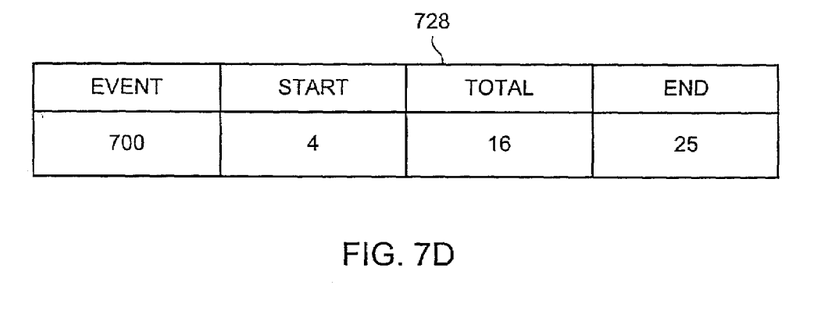

Similarly, the process can be repeated yet again with the generation of another record 716 in FIG. 7a which corresponds with the data record in FIG. 7d. The second record 724 in FIG. 7c is shown as utilizing the data from record 720 in FIG. 7b. Similarly, record 728 in FIG. 7d is shown as utilizing the data from record 724 in FIG. 7c. Thus, when a user decides to stop receiving the event, the previous record stored at the receiver can be accessed and modified so as to create a new record. Thus, the final record prepared for an event can be transmitted to the billing center for billing so as to indicate the event received, the starting epoch, the total number or epochs received and the last epoch received.

The rate at which a service or specific program is billed can be based on either an agreed to amount prior to selecting a program or a fixed rate set by the service provider. Thus, for example, the user can be presented with a user interface when first tuning to a new service that reads:

"This service is billed on a metered basis of $0.01/minute. Please press 'BUY' if you agree to this rate, and you will be charged each time you tune to this service for the rest of the month."

Figure 3:
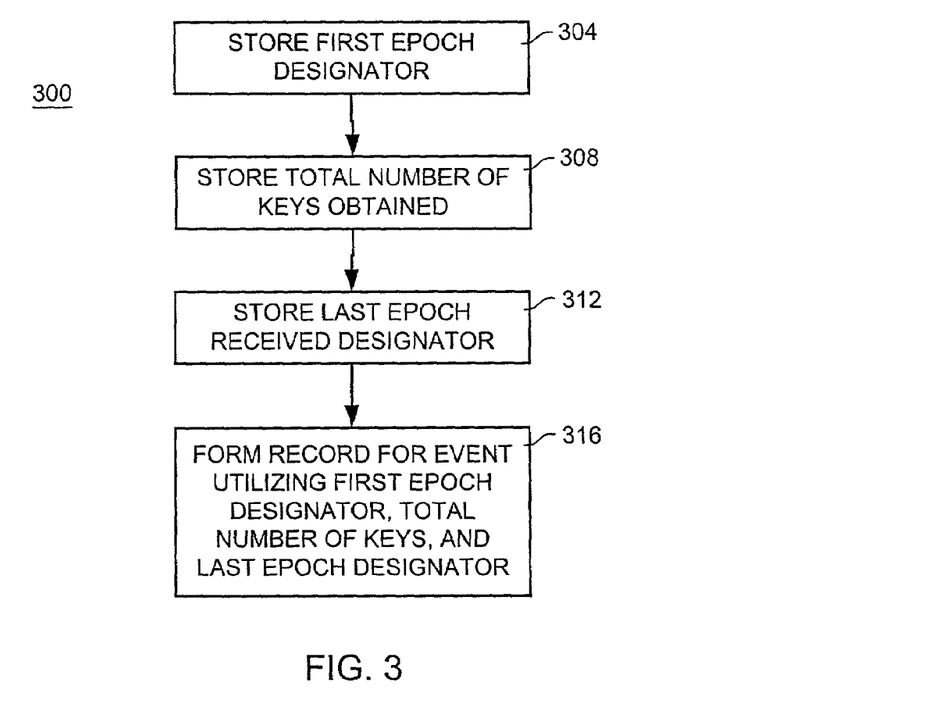
FIG. 3 illustrates a flowchart describing an embodiment of the invention for tracking a first epoch, a total number of keys obtained, a last epoch received, and an event record for received program content.
Figure 4:
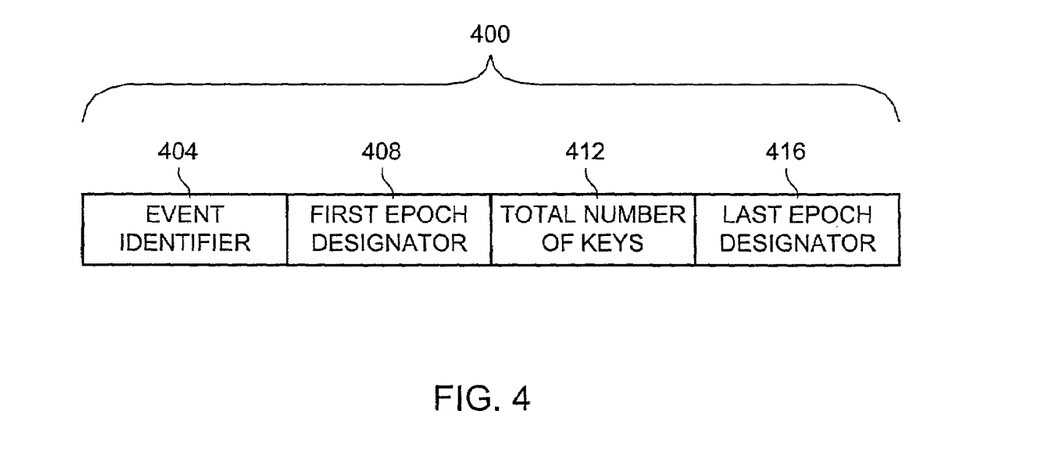
FIG. 4 illustrates an embodiment of the invention for a data structure for recording, for example, an event identifier, first epoch designator, total number of keys, and a last epoch designator.

In FIG. 3, a method 300 for creating a record is illustrated. In block 304, a first epoch designator is stored, for example in a memory at the receiver. In block 308, the total number of keys used to decrypt program content for an event is stored in the memory. In block 312, the designator for the last epoch received is stored in the memory. In block 316, a record for the event is created comprising the event identifier, the first epoch designator, the total number of keys, and the last epoch designator. A data structure for such a record is illustrated in FIG. 4 having an "Event Identifier" field 404, a "First Epoch Designator" field 408, a "Total Number of Keys" field 412, and a "Last Epoch Designator" field 416.

Figure 6:
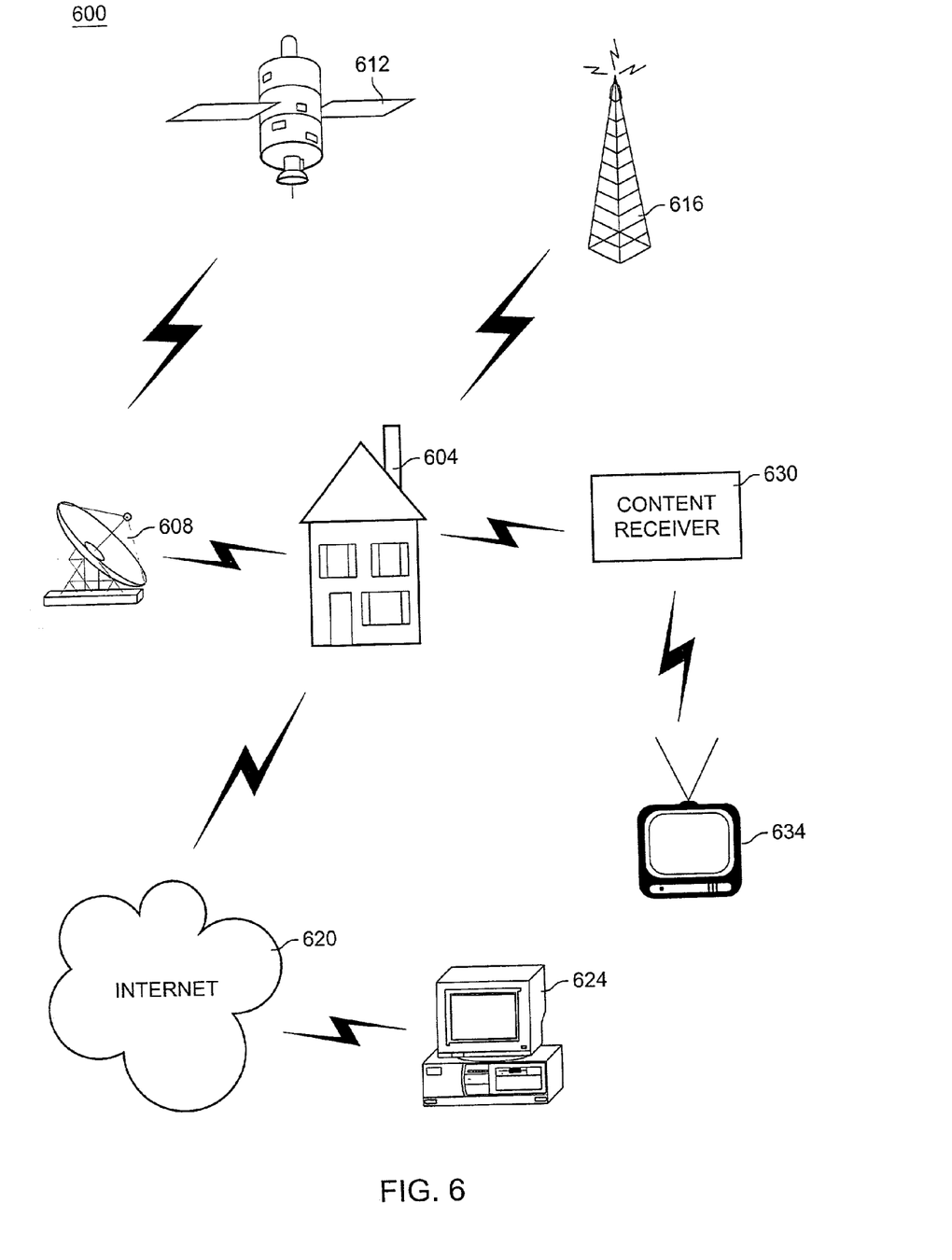
FIG. 6 illustrates an embodiment of the invention describing a communication system for implementing transmission of program content to a content receiver.

In FIG. 6, an exemplary system 600 for implementing one embodiment of the invention is shown. FIG. 6 shows a head end 604 which can also serve as the billing processor for a cable system, for example. The head end is coupled to a satellite receiver 608 which is itself coupled to a satellite 612. The satellite can provide content to the receiver for use by the head end. Similarly, a server 624 can provide program content to the head end via a network, such as the internet 620. Furthermore, a transmitter 616 can transmit content to the head end for distribution. The head end then supplies program content comprised of multiple events to the user at content receiver 630, such as a set top box for a television 634.

Figure 5:
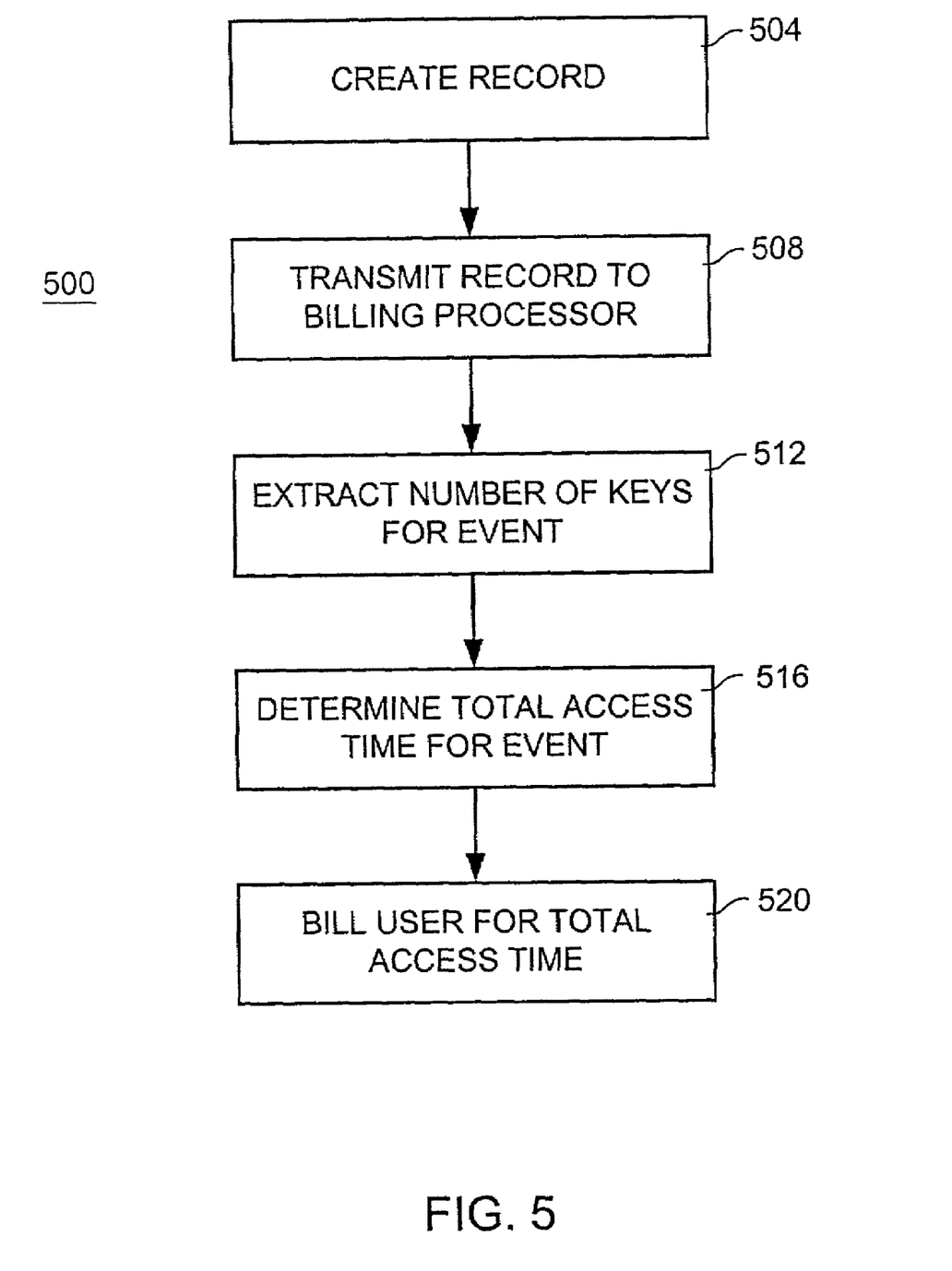
FIG. 5 illustrates a flowchart describing an embodiment of the invention for creating a record for a user and billing the user for the program.

At some point in time, the information regarding viewed programs will need to be reported to the billing center for billing of the customer. FIG. 5 illustrates one embodiment of the invention for implementing such a billing system. In block 504 of FIG. 5, a record is created for the received event. This record is then transmitted to the billing processor, as shown in block 508. At the billing processor, the number of keys used to watch the program can be determined from the data record. Similarly, the number of epochs received can be determined as the number of keys will correspond to the number of epochs received. Then, the total time that the user received the program can be computed as shown by block 516. Based on the billing rate applied to the event, the user can be billed for the event as illustrated by block 520.

Figure 8:
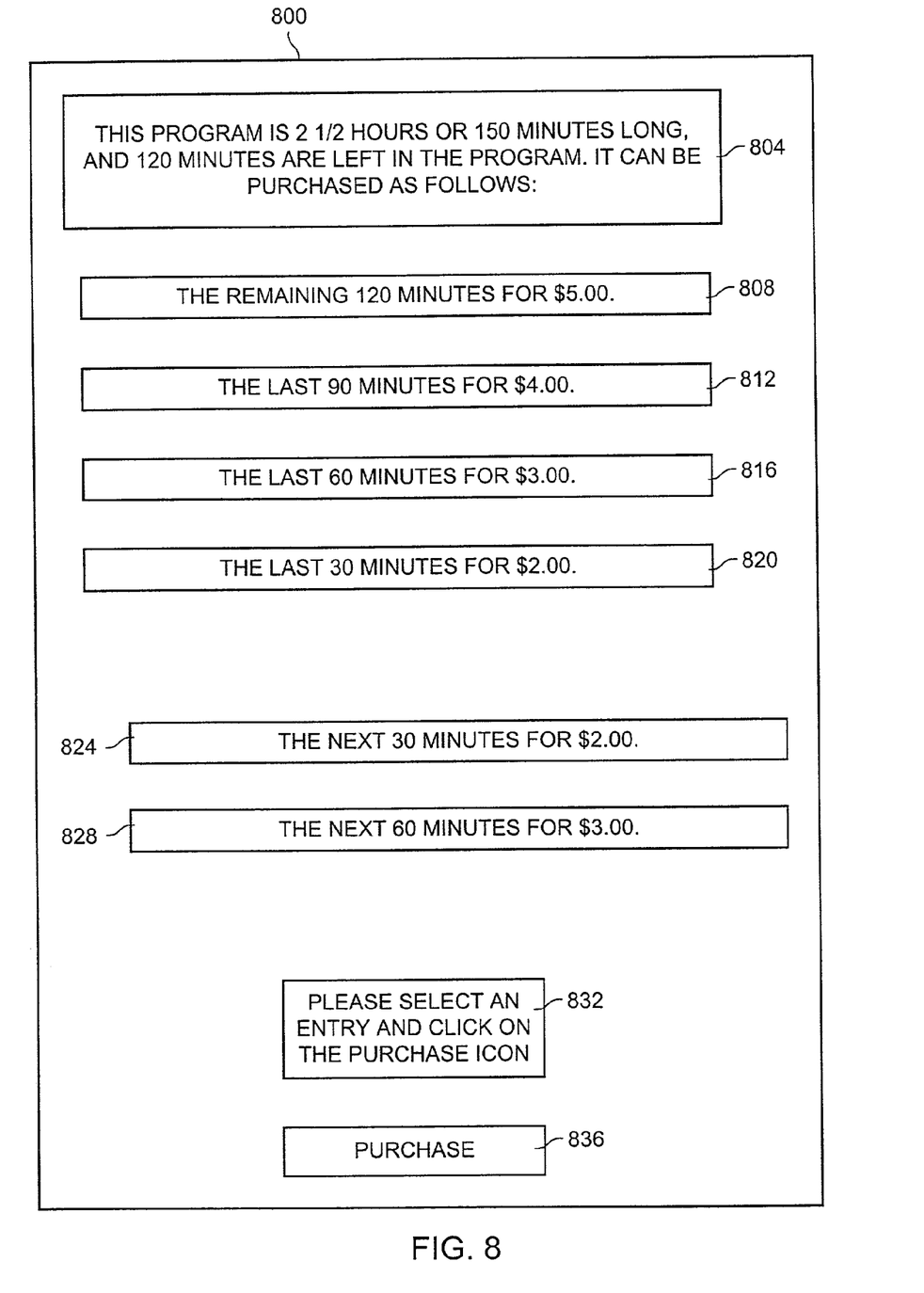
FIG. 8 illustrates a user interface for allowing a viewer to select a program for a pay by time method under one embodiment of the invention.

In addition to metered pay by time, one embodiment of the invention allows for variable price pay by time. This embodiment of the invention provides a viewer who tunes into a show after the show has started with different payment options for viewing the remainder of the show. For example, FIG. 8 illustrates a user interface 800 that could be used to provide a user with different options for viewing a show. The user interface could be comprised of a display section 804 that indicates how long a program is and how much time is remaining in the program for purchase. Then, alternatives could be presented for viewing different portions of the remaining program. In display section 808, for example, the indicator indicates that the remaining 120 minutes of the program can be purchased for $5.00. In display section 812, the indicator indicates that the last 90 minutes of the program can be purchased for $4.00, while display portion 816 indicates that the last 30 minutes could be purchased for $2.00. Alternatively, rather than indicating the remaining time available for purchase, a block of time could be indicated as available for purchase. Thus, indicator 824 of user interface 800 indicates that the next 30 minutes can be purchased for $2.00 while block 828 indicates that the next 60 minutes can be purchased for $3.00. Block 832 indicates to the user that a choice should be selected, for example, by clicking on an icon. Then, a "Purchase" icon 836 can be used to confirm the purchase choice of the user.

Figure 9:
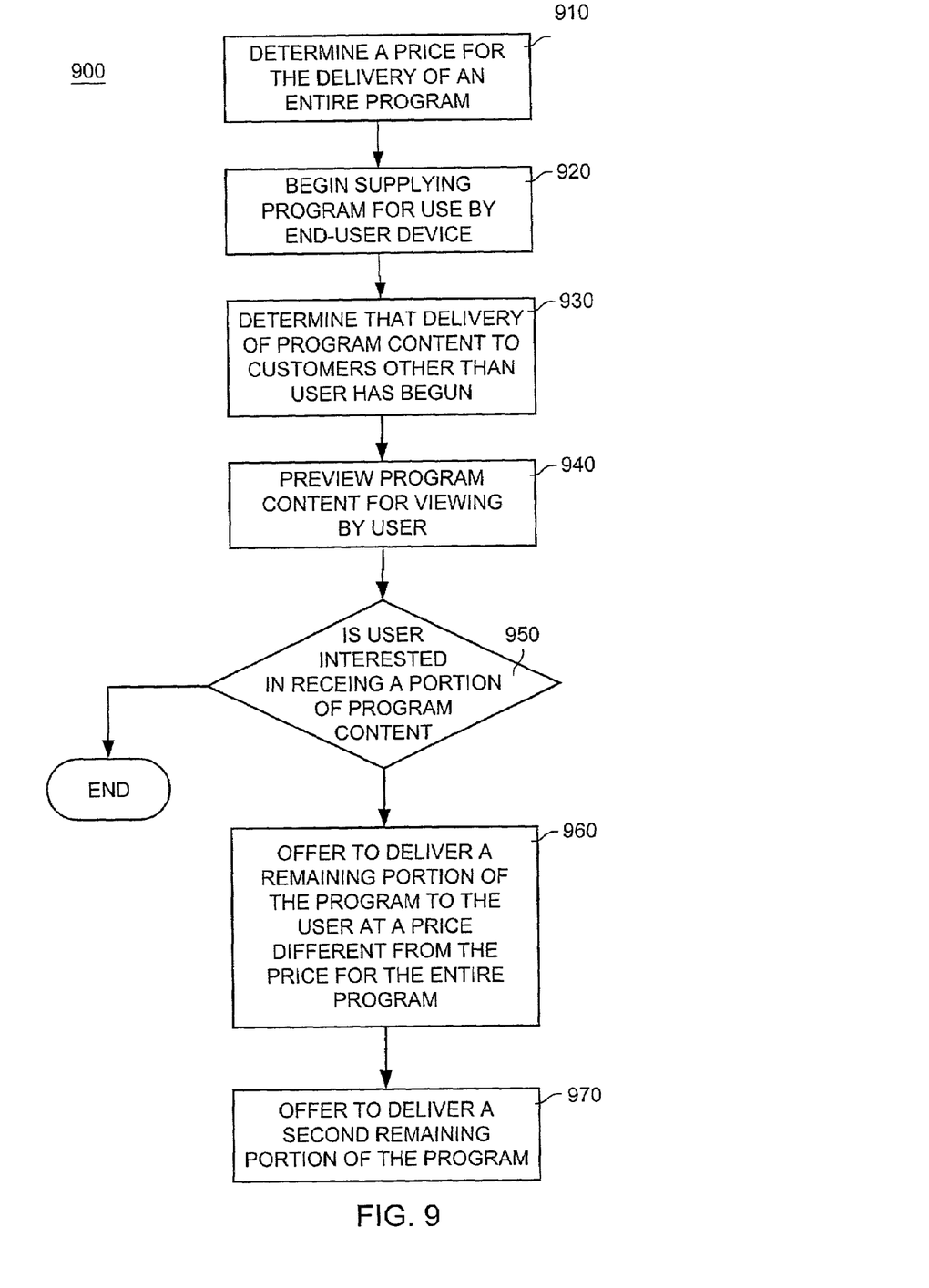
FIG. 9 illustrates a flowchart for implementing a pay by time method for one embodiment of the invention.

FIG. 9 illustrates a method 900 for implementing the variable price scheme. In block 910, a program provider determines a price for the delivery of a program to a user. Then, the program is supplied for use by end-user devices, e.g., set-top box, receivers, etc., as shown in block 920 and the end-users begin to receive the program content as shown in block 930. At some point during the program delivery, a user who is not yet watching the program will tune in to the channel providing the program content. A preview of the program content can be viewed by the user at this stage in order to entice the user to view the program, as shown in block 940. A determination is then made as to whether the user wants to receive a portion of the program material, as shown in block 950. If the user does not want to watch the program, the method ends and the preview either completes or is terminated. However, if the user does want to receive the program content, then the user is offered delivery of remaining portions of the program at a price different from the price for the entire program, as shown in block 960 and illustrated further by the user interface in FIG. 8. If the user only purchases a first portion of the program, a second portion of the program could be offered for purchase as shown in block 970.

In most instances it is believed that the price offered will be less for the remaining portion of a program than that required for the entire program. However, in some cases the value of the program may be a function of real time events. Thus, the price for the remainder of the program could actually increase as the events of the program unfold. Thus, the price of a basketball game initially thought to be one-sided might be priced less for initial viewers than for viewers who tune in later when the game turns out to be tightly contested or a potential upset.

Thus, the variable pricing method allows a service provider to offer less than the entire program, more than the entire program, a choice of different amounts of program time, a choice of different prices for different amounts of program time, a choice of intermediate portions of a program, as well as a free preview period.

The tracking system described above can be used to keep track of the user's actual watched time. Thus, an actual cryptoperiod corresponding to an epoch of the program can be determined. Furthermore, a record can be created to record the first watched epoch, the last watched epoch and the number of epochs watched. Thus, even though the user is billed according to the terms agreed to at the beginning of the session, data can be collected regarding the viewer's viewing habits. For example, if commercials appear at known epochs of a program, the record could be used to determine whether the viewer tuned away during that epoch.

In one embodiment of the invention a set-top box can be provided that is comprised of a security processor in which the cryptography keys for use in decrypting a selected program's content are used. Thus, when a user selects a desired encrypted program, the security processor can maintain the above-described record of viewing history.

For example, after viewing the very first working key epoch, the secure chip could maintain an internal count of the viewed epochs, incrementing as viewing progresses. If the user views the entire event, the secure device would report a single record after the event ended, showing the first epoch viewed, a duration equal to all the epochs of the program, and a last epoch viewed which matches the end time as measured in the epoch count. If the user tunes away part way through the program, however, the security device reports a record at that time showing a shorter duration and a last viewed count matching the tune away time. Then, when the user tunes back, the duration count can resume. Thus, a security processor or apparatus can maintain internal records for start/duration/end for at least as long as the event is running.

To ensure that the non-secure portion of the set-top box does not drop or ignore the reports, a billing mechanism can be utilized. For example, all of the records generated by the secured device can be linked. Thus, an authenticator that is a function of the linkage of all the supposedly reported events can be generated. If a pirate drops even one event, the reports received by the billing center will not be authenticated. Thus, the billing center will recognize that something is wrong. The billing center can then request a repeated report, which would clear up any communication errors or indicate a remaining fault indicative of a bad customer or pirate customer.

When Pay By Time event records are viewed along with Pay Per View events, the records of each may still be linked so as to generate an authenticator. When tuning in and out for a Pay By Time event, multiple records will be generated and linked to preceding and succeeding records. However, only the last record will be needed for billing purposes as it will relate the final statistics of start/duration/end which are of value for billing. Each earlier report can be discarded if an update for the same event is generated. Thus the secure linkage described above is necessary only once per event rather than for each and every record generated during the course of a single event.

One manner of accomplishing this is to include an event ID included with the record and to link each record generated for a Pay By Time event back to the final record for the preceding event. Thus, for each Pay By Time record generated for an event, that record will be linked back to the final record for the preceding event. This is due to the fact that one does not know a priori which record will be the last for a single event. Thus, the security device will use the identical chaining algorithm for each record it generates for a single Pay By Time event. Once the final record is actually computed, the authenticator can be calculated and individual records for each event (whether Pay Per View or Pay By Time) can be transmitted to the billing center where they are authenticated with the authenticator.

While various embodiments of the invention have been described as methods or apparatus for implementing the invention. It should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that the embodiments expressed above also be considered protected by this patent in their program code means as well.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures and acts recited herein can be recited as means for performing a function or steps for performing a function, respectively. Therefore, it should be understood that such language is entitled to cover all such structures or acts disclosed within this specification and their equivalents.

It is thought that the apparatuses and methods of the embodiments of the present invention and many of its attendant advantages will be understood from this specification and it will be apparent that various changes may be made in the form, construction and arrangement of the parts thereof without departing from the spirit and scope of the invention or sacrificing all of its material advantages, the form herein before described being merely exemplary embodiments thereof.

What is claimed is:

1. An apparatus for measuring reception of program content by a user, said apparatus comprising:
   a content receiver operable to receive a plurality of keys for use in decrypting said program content for said user;
   code configured for determining an initial epoch, an ending epoch, and a cumulative number of received epochs;
   a processor configured to determine a cumulative number of said plurality of keys utilized in decrypting said program content for said user, so as to determine a total number of epochs of said program content received by said user; and
   wherein said processor is configured to record an initial epoch of said program content.

2. The apparatus as described in claim 1 and further comprising code configured for counting the number of received epochs.

3. The apparatus as described in claim 1 and further comprising code configured for communicating said number of received epochs to a billing processor.

4. The apparatus as described in claim 3 and further comprising code configured for communicating to said billing processor an initial epoch.

5. The apparatus as described in claim 3 and further comprising code configured for communicating to said billing processor an ending epoch.

6. The apparatus as described in claim 1 and further comprising code configured for determining an ending epoch.

7. The apparatus as described in claim 1 and further comprising code configured for determining an ending epoch.

8. The apparatus as described in claim 7 and further comprising code configured for determining a cumulative number of received epochs.

9. A computer data signal embodied on a computer readable medium, comprising: a device comprising of a program event segment; a device comprising of a received program duration segment representing how long said program event was received by said user; a device comprising of a first epoch segment representing the first epoch of said program event received by said user, a device comprising of a last epoch segment representing the last epoch of said program event received by said user; and a plurality of keys for use in decrypting said program content for said user wherein a total number of epochs of said program event received by said user is determined based upon said initial epoch and said plurality of keys.

10. A method of measuring reception of program content by a user, said method comprising:
    providing program content for reception by said user;
    determining an initial epoch of said program content received by said user;
    providing a plurality of keys for use by said user in decrypting said program content, each of said plurality of keys operable for a predefined portion of said program content;
    determining a last epoch of said program content received by said user;
    determining from said plurality of keys a total number of epochs of said program content received by said user;
    determining an amount of time that said user receives said program content based upon said initial epoch and said total number of epochs of said program content received by said user.

11. The method as described in claim 10 and further comprising:
    updating the total number of epochs of said program content received by said user as said program is received by said user; and
    updating the record of the last epoch of said program content received by said user as said program content is received by said user.

12. The method as described in claim 10 and further comprising:
    reporting said total number of epochs to a billing system.

13. The method as described in claim 12 and further comprising:
    billing said user based upon said total number of epochs.

14. The method as described in claim 10 and further comprising:
    determining a variable cost for said program content received by said user, said variable cost based at least in part on said total number of epochs and said initial epoch.

15. The method as described in claim 10 and further comprising:
    determining a variable cost for said program content received by said user, said variable cost based at least in part on said total number of epochs and said last epoch.

16. The method as described in claim 10 and further comprising:
    determining a variable cost for said program content received by said user, said variable cost based at least in part on said initial epoch and said last epoch.

17. The method as described in claim 10 and further comprising:
    recording said total number of epochs in a secure processor of a client device; and
    updating said total number of epochs in said secure processor during reception of said program content.

18. The method as described in claim 10 and further comprising:
    creating a first record for a first event of program content material, said record comprising said initial epoch and said total number of epochs;
    creating a second record for a second event of different program content material, said second record comprising an initially viewed epoch of said second event and a total number of epochs of said second event;
    linking said first record with said second record for transmission to a billing center; and
    cryptographically transmitting said linked first and second records to said billing center.

19. The method as described in claim 10 and further comprising:
    creating a record in a secure processor at a client device, said record comprising said initial epoch and said total number of epochs;
    transmitting said record to a general purpose processor at the client device;
    transmitting said record to a billing system.

20. The method as described in claim 19 wherein said transmitting said record to said billing system comprises transmitting a final report to said billing system so as to reduce updated reports being sent to said billing system.

21. The method as described in claim 20 wherein said final report is the only report sent to said billing system for said program content material.

22. A method of measuring reception of program content by a user, said method comprising:
    providing program content for reception by said user;
    determining an initial epoch of said program content received by said user;
    providing a plurality of keys for use by said user in decrypting said program content, each of said plurality of keys operable for a predefined portion of said program content;
    determining from said plurality of keys a total number of epochs of said program content received by said user;
    determining an amount of time that said user receives said program content based upon said initial epoch and said total number of epochs of said program content received by said user;
    recording the last epoch of said program received by said user; and
    updating the record of the last epoch of said program received by said user as a result of said user ceasing to receive said program content.

23. The method as described in claim 22 and further comprising:
    updating the total number of epochs of said program content received by said user as said program content is received by said user, upon said user returning to reception of said program content after a cessation in receiving said program content.

* * * * *